US005518152A

United States Patent [19]

Burcham et al.

[11] Patent Number: 5,518,152
[45] Date of Patent: May 21, 1996

[54] MEASURING CANISTER

[75] Inventors: Gregory S. Burcham, Spruce Pine; Edward S. Robbins, III, Florence, both of Ala.

[73] Assignee: E. S. Robbins Corporation, Muscle Shoals, Ala.

[21] Appl. No.: 465,985

[22] Filed: Jun. 6, 1995

[51] Int. Cl.$^6$ .................................................. G01F 11/28
[52] U.S. Cl. .......................... 222/452; 222/158; 222/441; 222/454
[58] Field of Search ..................... 222/158, 441, 222/450–452, 454–456, 465.1

[56] References Cited

U.S. PATENT DOCUMENTS

| | | | |
|---|---|---|---|
| 1,933,448 | 10/1933 | Prahl | 222/451 |
| 1,933,449 | 10/1933 | Prahl | 222/451 |
| 2,021,444 | 11/1935 | Duell | 222/451 |
| 2,025,796 | 12/1935 | Waldheim | 222/456 X |
| 2,162,068 | 6/1939 | Duell et al. | 222/451 |
| 2,538,336 | 1/1951 | Smith | 222/455 |
| 2,619,264 | 11/1952 | Sprucinski | 222/456 |
| 2,748,995 | 6/1956 | Hightower et al. | 222/452 X |
| 2,799,436 | 7/1957 | Bernhardt | 222/454 X |
| 2,819,000 | 1/1958 | Boguss et al. | 222/454 |
| 2,844,266 | 7/1958 | Hofe | 215/244 |
| 3,036,742 | 5/1962 | Wagoner et al. | 222/158 |
| 3,148,804 | 9/1964 | James | 222/441 X |
| 3,168,223 | 2/1965 | Capers | 222/158 |
| 3,209,961 | 10/1965 | Wassell | 222/441 X |
| 3,275,324 | 4/1967 | Hazard | 222/452 |
| 3,353,725 | 11/1967 | Caceres | 222/456 |
| 3,985,274 | 10/1976 | Lubalin et al. | 222/456 X |
| 4,102,477 | 7/1978 | Yoon | 222/452 X |
| 4,144,989 | 3/1979 | Joy | 222/456 X |
| 4,219,136 | 8/1980 | Williams et al. | 222/452 X |
| 4,637,529 | 1/1987 | Knight | 222/452 |
| 4,779,771 | 10/1988 | Song | 222/456 |
| 4,782,984 | 11/1988 | Su | 222/454 X |
| 5,261,575 | 11/1993 | Keller | 222/455 |
| 5,467,903 | 11/1995 | Sorensen et al. | 222/455 |

*Primary Examiner*—Kevin P. Shaver
*Attorney, Agent, or Firm*—Locke Reynolds

[57] ABSTRACT

A measuring canister is disclosed for storing any of a variety of particulate solid particulate materials, and for dispensing in a controlled manner a portion of the stored particulate material selected by the user to be any portion up to maximum volume, while preventing spillage from or dispensing of the remaining particulate material. The interior of a container having an open top is divided into a storage compartment and a measuring dispensing compartment by a partition having a notch. A generally planar flap is hinged to a cover having a dispensing orifice proximate to the measuring compartment, with the cover removably attached to the container. The flap is capable of moving between a first position where the dispensing orifice is closed and particulate material present in the storage compartment may pass from the storage compartment into the measuring compartment as the present invention is tilted, and a second position where the dispensing orifice is open and the notch is closed, so that particulate material may be dispensed from the measuring compartment through the dispensing orifice.

20 Claims, 9 Drawing Sheets

5,518,152

MEASURING CANISTER

BACKGROUND OF THE INVENTION

1. Field of the Invention

The present invention generally relates to canisters for the storage and dispensing of particulate solids, and more particularly concerns canisters of the type that are capable of dispensing a stored particulate solid in a measured amount that may be selected by the user.

2. Description of the Prior Art

There are presently available a number of canisters that may be used to store particulate solids and, in addition, are capable of dispensing a portion of the particulate solid. The array of such devices includes canisters where the user may select a volume, up to a specified maximum volume, of a particulate solid to be dispensed through a closure flap disposed proximate to the bottom of the canister, such as that described in U.S. Pat. No. 2,819,000. Further, there are presently available canisters where a single, pre-determined volume of a particulate solid may be dispensed, such as that described in U. S. Pat. No. 4,637,529, and, in addition, canisters where the user may select one of a number of pre-determined volumes of a particulate solid to be dispensed, such as that described in U.S. Pat. No. 4,782,984.

Despite the availability of such canisters, there exists a need in the art for a measuring canister that is capable of conveniently storing any of a wide variety of particulate solids, yet is capable of dispensing a measured portion of the particulate solid in a controlled manner, with the volume of material to be dispensed selected by the user to be any volume up to a maximum volume, and simultaneously preventing the remaining stored material from being dispensed or spilled during the dispensing operation.

SUMMARY OF THE INVENTION

In order to aid in the understanding of the present invention, it can be stated in essentially summary form that it is directed to a measuring canister that is capable of storing any of a variety of particulate solids and dispensing therefrom in a controlled manner a measured portion of the particulate solid, the measured portion selected by the user to be any volume up to a maximum volume, while simultaneously preventing the remaining stored material from spilling or being dispensed.

More specifically, the present invention is directed to a measuring canister having a container with an open top, a generally planar bottom, a front surface, a rear surface, and sides. A handle is formed along the rear surface and has indented side portions and indented top portions. The container may be formed of a resilient, visually translucent material such as any of a number of commonly available plastics. A partition having an arcuate notch is disposed generally normal to the bottom and attached within the container, dividing the interior of the container into a storage compartment and a measuring dispensing compartment, the notch disposed adjacent to the open top. The rear surface is disposed proximate to the storage compartment, and the front surface is disposed proximate to the measuring dispensing compartment. Volumetric indicia are disposed on the container at the front surface, proximate to the measuring dispensing compartment, and a circumferential bead is formed at the open top, to facilitate removable attachment of a resilient cover.

The cover, having an interior surface, an exterior surface, and a generally semicircular dispensing orifice, is provided with a circumferential inner lip and an outer lip disposed to define a circumferential tapered passage and a circumferential slot. The dimensions of the passage, the slot and the bead are selected so that the cover may be removably snapped onto the container by pressing the bead into the slot. When the cover is attached to the top, the interior surface is adjacent to the interior of the container and the dispensing orifice is proximate to the measuring dispensing compartment. A protruding arcuate rib, integrally formed with the cover, is disposed at the interior surface, proximate to and parallel with the straight edge of the semicircular dispensing orifice. Disposed at each end of the rib is one of a pair of snap-in hinge cavities, with the axes of the snap-in hinge cavities coaxial with and parallel to the rib.

A resilient, generally planar flap, having an arcuate first end and an arcuate second end is hinged to the cover using an arched central portion and a pair of snap-in hinges tongues. The interior radius of the central portion is chosen to be slightly greater than the radius of the rib, so that the central portion is capable of smooth coaxial rotation with respect to the rib when central portion is disposed in coaxial alignment with the rib. The first end is formed to have a generally semicircular step, with the dimensions of the step chosen so that the step is similar in shape to but slightly smaller than the dispensing orifice. In this way, the step may be placed into engagement within the dispensing orifice. A rounded step bead is disposed at the distal end of the step, and a rounded projection is disposed along each of the sides of second end. The flap is attached to the cover in the manner of a hinge, by snapping each tongue into a cavity with the central portion disposed around the rib, with the first end disposed proximate to the exterior surface, and the second end disposed proximate to the interior surface.

Mounted to the cover, the flap may be moved in hinged rotation between a first position where the first end is disposed to close the dispensing orifice and the second end is disposed proximate to the interior surface, and a second position where the first end is disposed away from and uncovering the dispensing orifice and the second end is disposed to cover and close the notch. When the flap is disposed in the first position, the step is engaged within the dispensing orifice. The dimension of the step bead is chosen so that as the flap is placed in the first position, the first end is removably attached to the cover by snapping the step into the dispensing orifice with the first end covering and closing the dispensing orifice. The dimensions of the second end are chosen so that the notch and the second end are capable of mating engagement when the flap is in the second position, and the dimensions of the projections are chosen to permit the second end to be snapped into the notch, with the second end acting to cover and close off the notch.

The present invention may be used by placing a particulate material in the storage compartment and snapping the cover into place with the bead disposed within the slot. With the flap disposed in the first position, the present invention may be used to store the particulate material, and may, in addition, be lifted using the handle and tilted so that particulate material may flow through the notch from the storage compartment into the measuring dispensing compartment. Thereafter, the present invention may be placed in an upright position and the user may inspect the measuring dispensing compartment and ascertain whether the volume of particulate material present in the measuring dispensing compartment is that which is desired to be dispensed, referring to the indicia. If insufficient particulate material has been transferred to the measuring dispensing compartment, the present invention may once again be tilted, allowing additional particulate material to pass into measuring dispensing compartment. Conversely, should the volume of particulate material in the measuring dispensing compartment be too great, the present invention may be tilted in the opposite sense, allowing particulate material to return to the storage compartment. The user may thus select to dispense any volume of material, up to a maximum volume determined by the volume of the measuring dispensing compartment, without limitation to a few discrete pre-selected volumes. When the desired volume of particulate material is present in the measuring dispensing compartment, the flap is rotated to the second position, with the second end snapped into the notch, so that the second end covers and closes the notch, preventing particulate material from passing between the storage compartment and the measuring dispensing compartment, and simultaneously acting to rotate the first end away from the dispensing orifice. Finally, the present invention is tilted so that particulate material in the measuring dispensing compartment is dispensed through the dispensing orifice, without affecting particulate material in the storage compartment.

It is an object of the present invention to provide a measuring canister that is capable of storing any of a wide variety of particulate solids.

It is another object of the present invention to provide a measuring canister that is capable of conveniently dispensing a pre-selected portion of a stored particulate solid within the canister as chosen by the user to be any volume up to a maximum volume.

It is another object of the present invention to provide a measuring canister that is capable of dispensing a pre-selected portion of a stored particulate solid in a controlled manner.

It is another object of the present invention to provide a measuring canister that is capable of dispensing a pre-selected portion of a stored particulate solid without spillage from or dispensing the remaining portion of the particulate solid.

It is another object of the present invention to provide a measuring canister that may be easily and quickly filled and dispensed.

It is another object of the present invention to provide a measuring canister that is compact, lightweight, inexpensive to produce, and of relatively simple construction with a minimum number of components, yet is of sturdy construction and may be easily disassembled and cleaned.

Further objects and advantages of the present invention will be apparent from a study of the following portion of the specification, the claims, and the attached drawings.

DESCRIPTION OF THE PREFERRED EMBODIMENT

Figure 1:
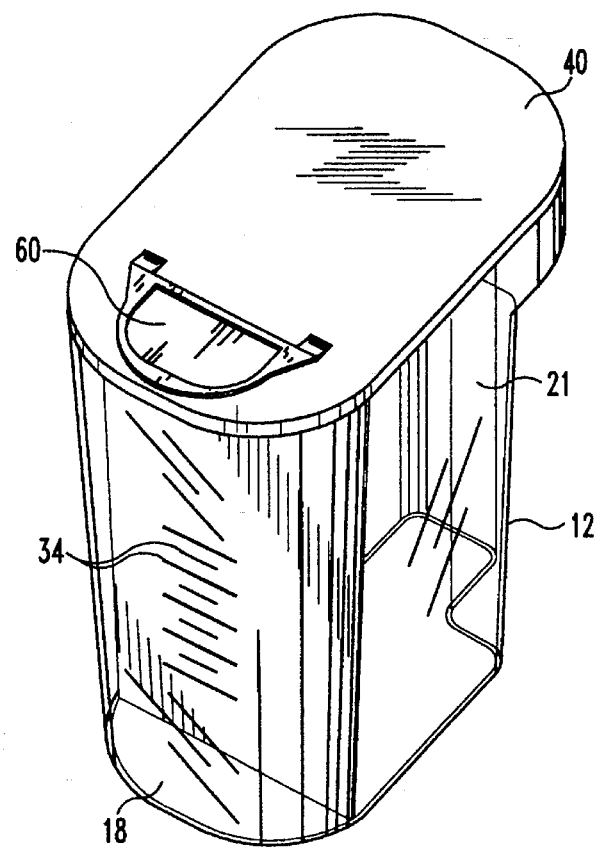
FIG. 1 is a perspective view of a measuring canister representing the present invention with the flap disposed in the first position where the dispensing orifice is covered.
Figure 2:
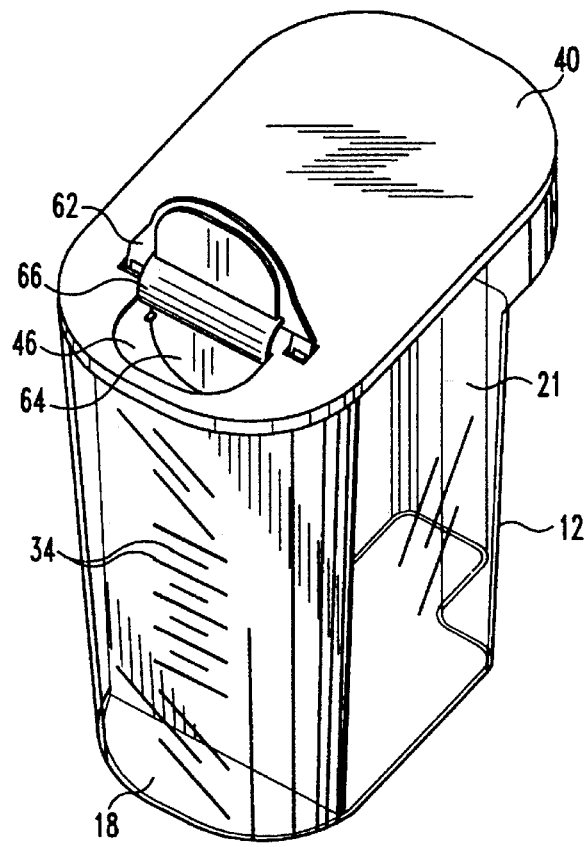
FIG. 2 is a perspective view of a measuring canister representing the present invention with the flap disposed in the second position where the dispensing orifice is uncovered.
Figure 3:
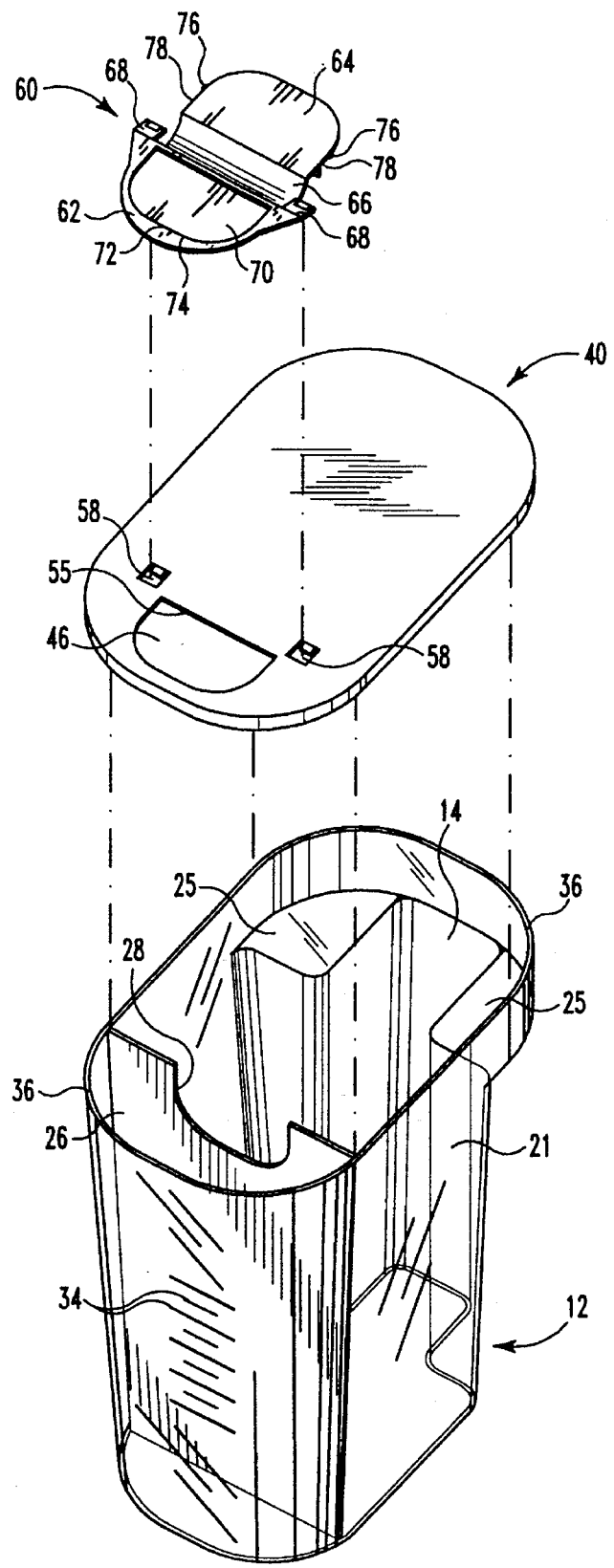
FIG. 3 is an exploded perspective view of a measuring canister representing the present invention.
Figure 4:
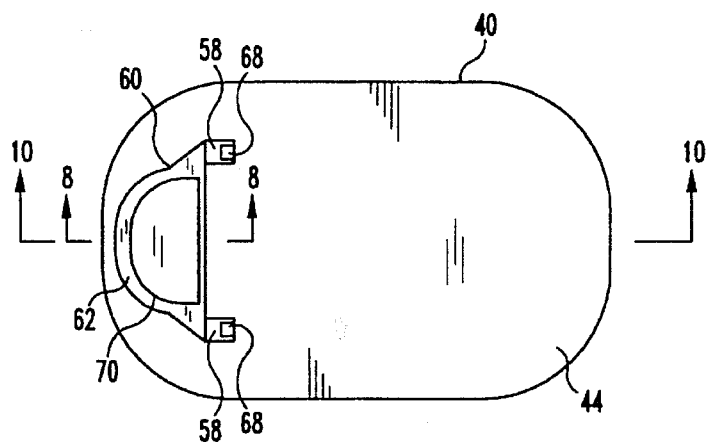
FIG. 4 is a top plan view of a measuring canister representing the present invention.
Figure 5:
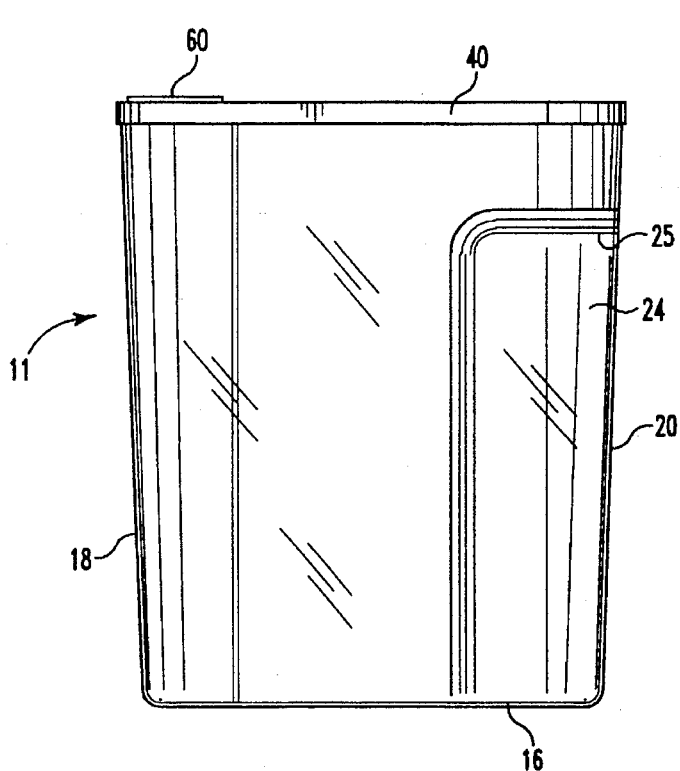
FIG. 5 is a side elevation view of a measuring canister representing the present invention.
Figure 6:
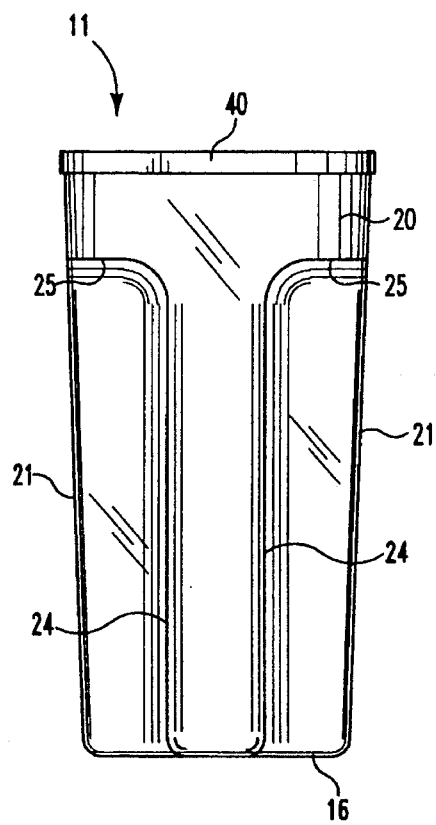
FIG. 6 is a rear elevation view of a measuring canister representing the present invention.
Figure 7:
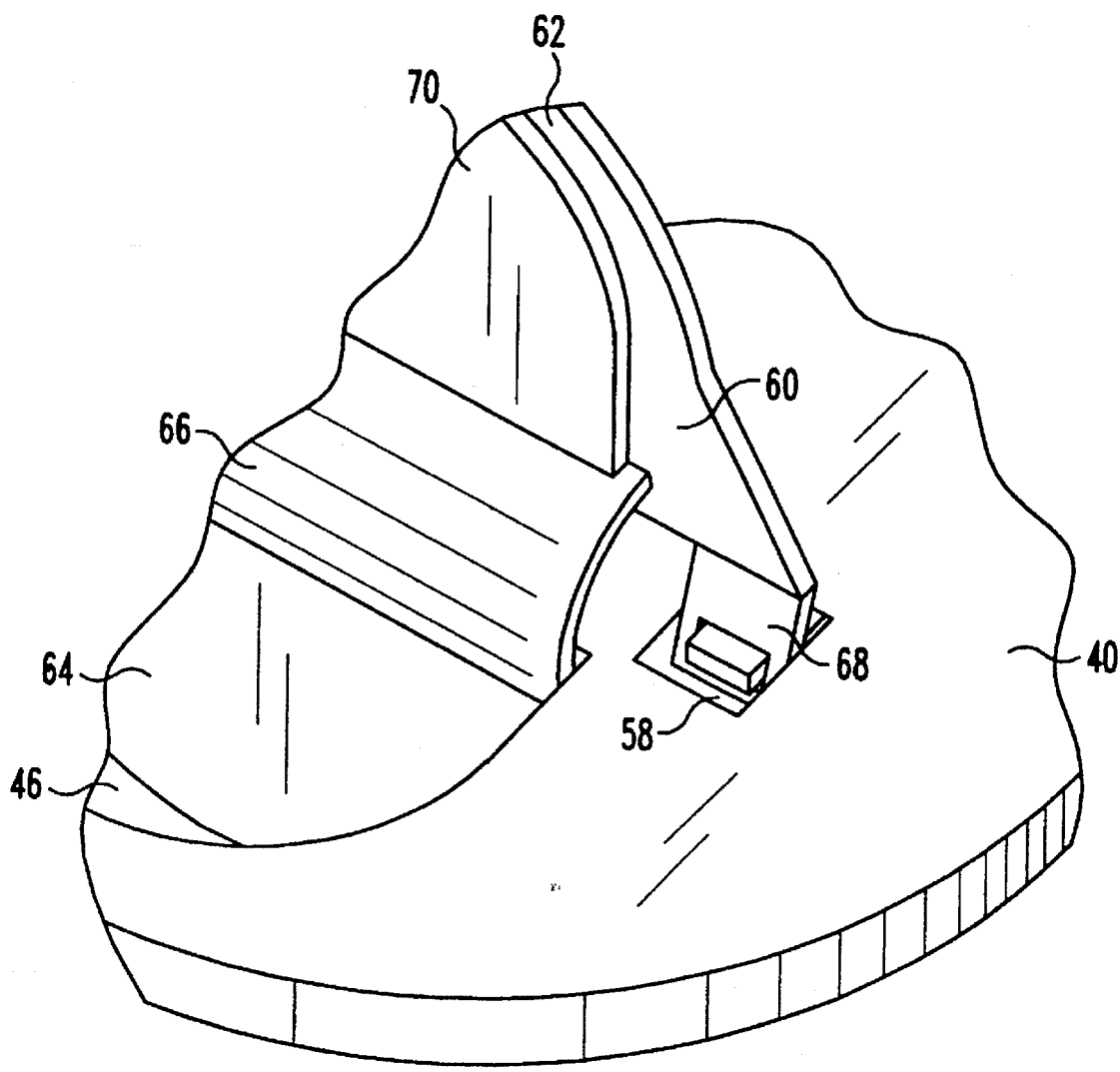
FIG. 7 is a fragmentary detail view of the hinge tongue, hinge cavity, and flap of a measuring canister representing the present invention.
Figure 8:
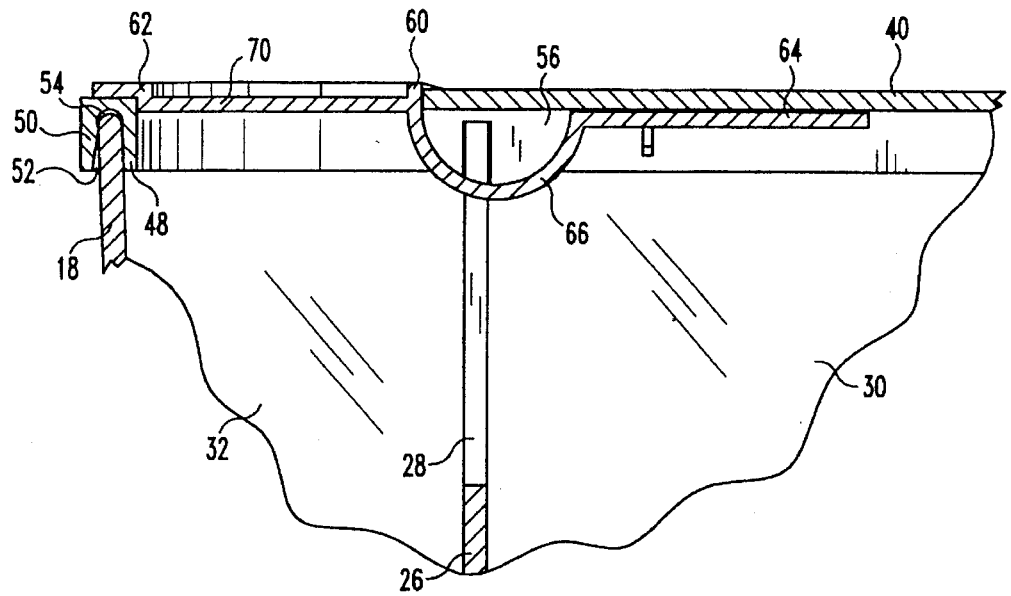
FIG. 8 is a fragmentary detail cross-section view of a measuring canister representing the present invention taken along line 8—8 of FIG. 4 shown with the flap in the first position where the dispensing orifice is covered.
Figure 9:
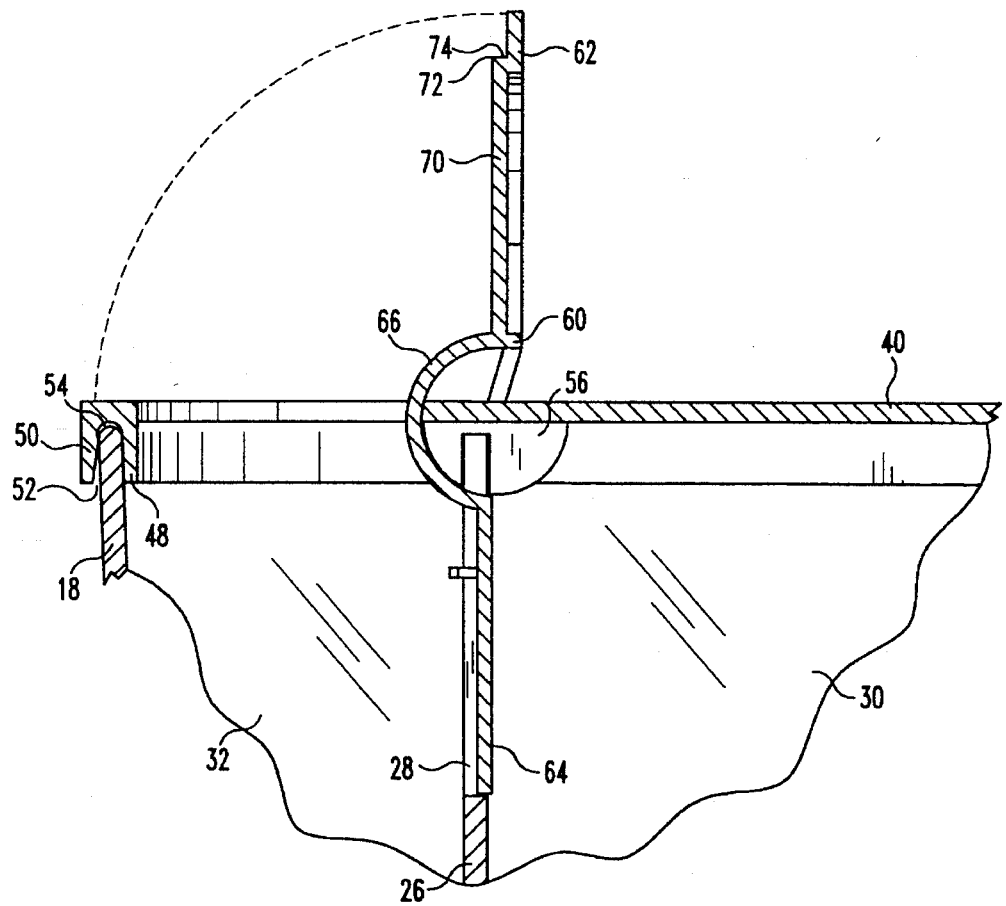
FIG. 9 is a fragmentary detail cross-section view of a measuring canister representing the present invention taken along line 8—8 of FIG. 4, but shown with the flap in the second position where the dispensing orifice is uncovered.

The following portion of the specification, taken in conjunction with the drawings, sets forth the preferred embodiment of the present invention. The embodiment of the invention disclosed herein is the best mode contemplated by the inventor for carrying out the invention in a commercial environment, although it should be understood that various modifications can be accomplished within the parameters of the present invention.

Referring now to the drawings for a detailed description of the present invention, reference is first made to FIGS. 1-6, generally depicting a measuring canister 11 of the present invention, showing container 12 having open top 14, generally planar bottom 16, front surface 18, rear surface 20, and sides 21. Indented handle 22 is formed along rear surface 20, and has indented side portions 24 and indented top portions 25. Container 12 may be formed of a resilient, visually translucent material such as any of a number of commonly available plastics. Partition 26, having an arcuate notch 28, is disposed generally normal to bottom 16 and attached within container 12, thereby dividing the interior of container 12 so as to form storage compartment 30 and measuring dispensing compartment 32, with notch 28 disposed adjacent to open top 14. Rear surface 20 is in this way disposed proximate to storage compartment 30, and front surface is disposed proximate to measuring dispensing compartment 32. Partition 26 may be formed of a visually opaque material, in order to provide visual contrast with respect to container 12, as hereafter described. Indicia 34 are disposed on container 12 at front surface 18, proximate to measuring dispensing compartment 32, and indicate the volume of contents of measuring dispensing compartment 32. A circumferential bead 36 is formed at open top 14.

Depicted in FIGS. 1–9 is resilient cover 40, having interior surface 42, exterior surface 44, and generally semicircular dispensing orifice 46. Circumferential inner lip 48 and outer lip 50 are disposed to define circumferential tapered passage 52 and circumferential slot 54. The dimensions of passage 52, slot 54 and bead 36 are chosen so that cover 40 may be removably attached to container 12 by aligning bead 36 within passage 52 and pressing cover 40 towards container 12, thereby forcing bead 36 into slot 54 in the manner of a snap-on attachment, forming a seal between cover 40 and container 12. In the mode where cover 40 is attached to top 14, interior surface 42 is adjacent to the interior of container 12 and dispensing orifice 46 is proximate to measuring dispensing compartment 32, with straight edge 55 defined by semicircular dispensing orifice 46 parallel to partition 26. Protruding arcuate rib 56, integrally formed with cover 40, is disposed at interior surface 42, proximate to and parallel with straight edge 55. Disposed at each end of rib 56 is one of a pair of snap-in hinge cavities 58, the axes of snap-in hinge cavities 58 coaxial with and parallel to rib 56.

As shown in FIGS. 1–5 and 7–9, resilient, generally planar flap 60, having arcuate first end 62 and arcuate second end 64, is hinged to cover 40 using arched central portion 66 and pair of snap-in hinge tongues 68. The interior radius of central portion 66 is chosen to be slightly greater than the radius of rib 56, so that, as will be described, central portion 66 is capable of smooth coaxial rotation with respect to rib 56 when central portion 66 is disposed in coaxial alignment with rib 56. First end 62 is formed to have generally semicircular step 70, with the dimensions of step 70 chosen so that step 70 is similar in shape to but slightly smaller than dispensing orifice 46, thereby permitting step 70 to be placed into engagement within dispensing orifice 46. Rounded step bead 72 is disposed at distal end 74 of step 70, and one rounded projection 76 is disposed along each second end side 78.

Flap 60 is mounted to cover 40 in the manner of a hinge, by snapping each hinge tongue 68 into a hinge cavity 58 with central portion 66 disposed around rib 56, so that first end 62 is disposed proximate to exterior surface 44, and second end 64 is disposed proximate to interior surface 42. In this way, flap 60 is movable with respect to cover 40 in the manner of hinged rotation between a first position, as shown in FIGS. 1, 4, 5, 8, and 10–12, where first end 62 is disposed to close dispensing orifice 46 and second end 64 is disposed proximate to interior surface 42, and a second position, as shown in FIGS. 2, 7, 9, and 13, where first end 62 is disposed away from and uncovering dispensing orifice 46 and second end 64 is disposed to cover and acts to close notch 28. When flap 60 is disposed in said first position, step 70 is engaged within dispensing orifice 46. The dimension of step bead 72 is chosen so that as flap 60 is placed in said first position, first end 62 is removably attached to cover 40 by snapping flap 60 into dispensing orifice 46, with first end 62 disposed to cover and close off dispensing orifice 46. The dimensions of second end 64 are chosen so that notch 28 and second end 64 are capable of mating engagement when flap 60 is disposed in said second position, and the dimensions of projections 76 chosen to permit second end 64 to be snapped into notch 28. Hence, second end 64 acts to cover and close off notch 28, and flap 60 is held in said second position for convenient use of the present invention in the dispensing operation, as hereinbelow described.

Figure 10:
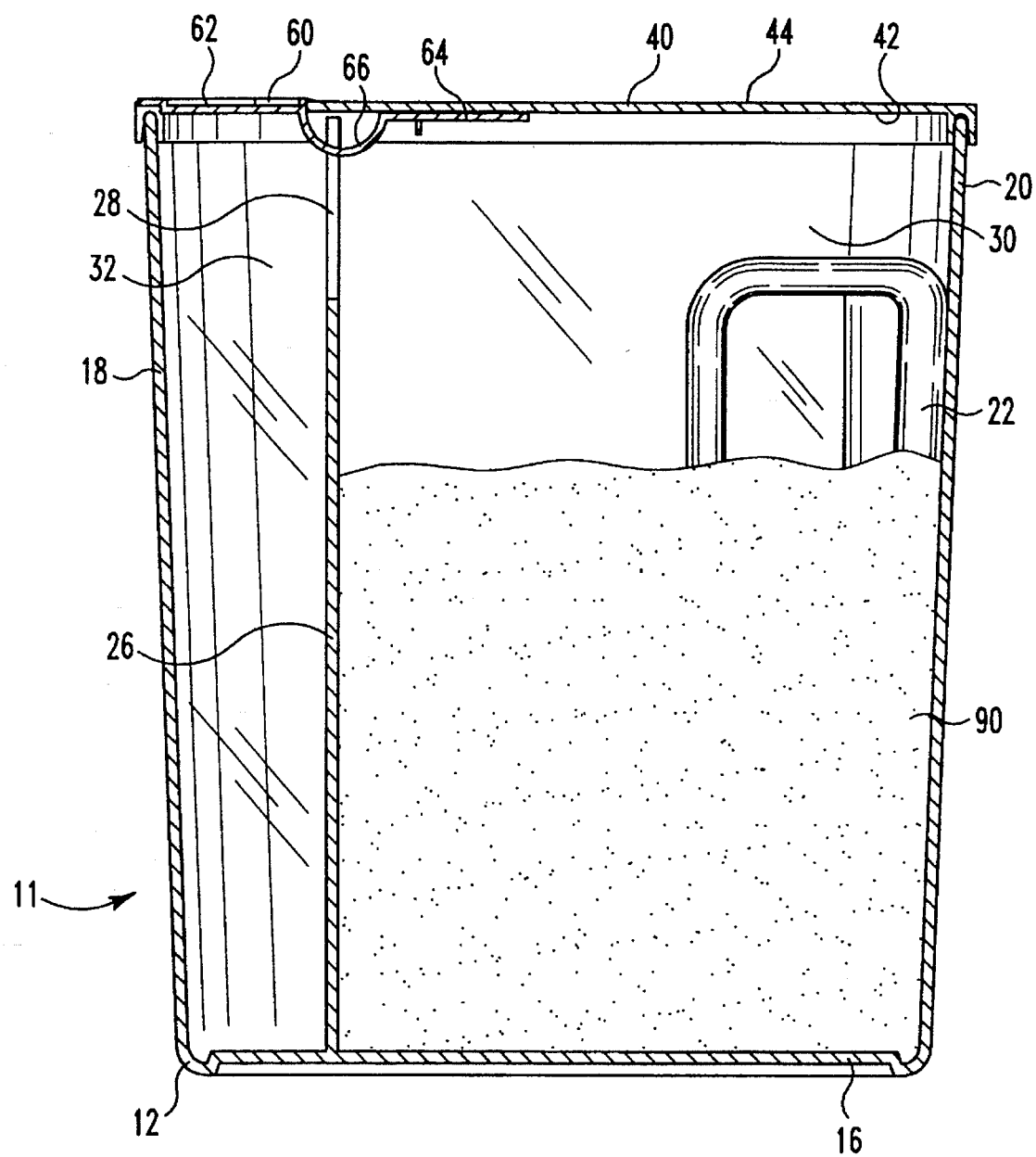
FIG. 10 is a side cross-section view of a measuring canister representing the present invention in an upright position, taken along line 10—10 of FIG. 4 and shown where particulate material is present in the storage compartment.
Figure 11:
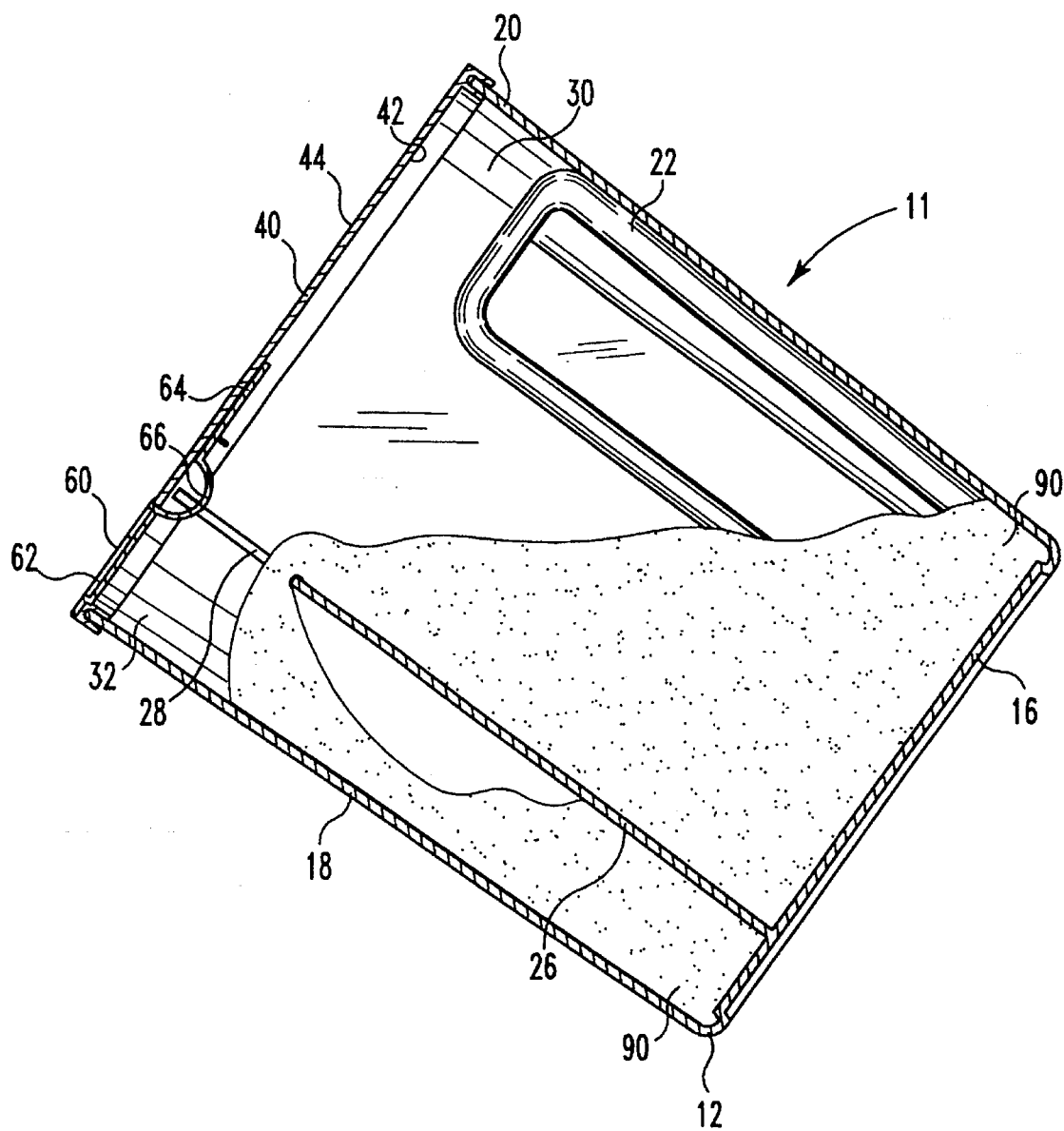
FIG. 11 is a side cross-section view of a measuring canister representing the present invention in a tilted position, taken along line 10—10 of FIG. 4 and shown where a portion of the particulate material present in the storage compartment is being transferred to the measuring dispensing compartment.
Figure 12:
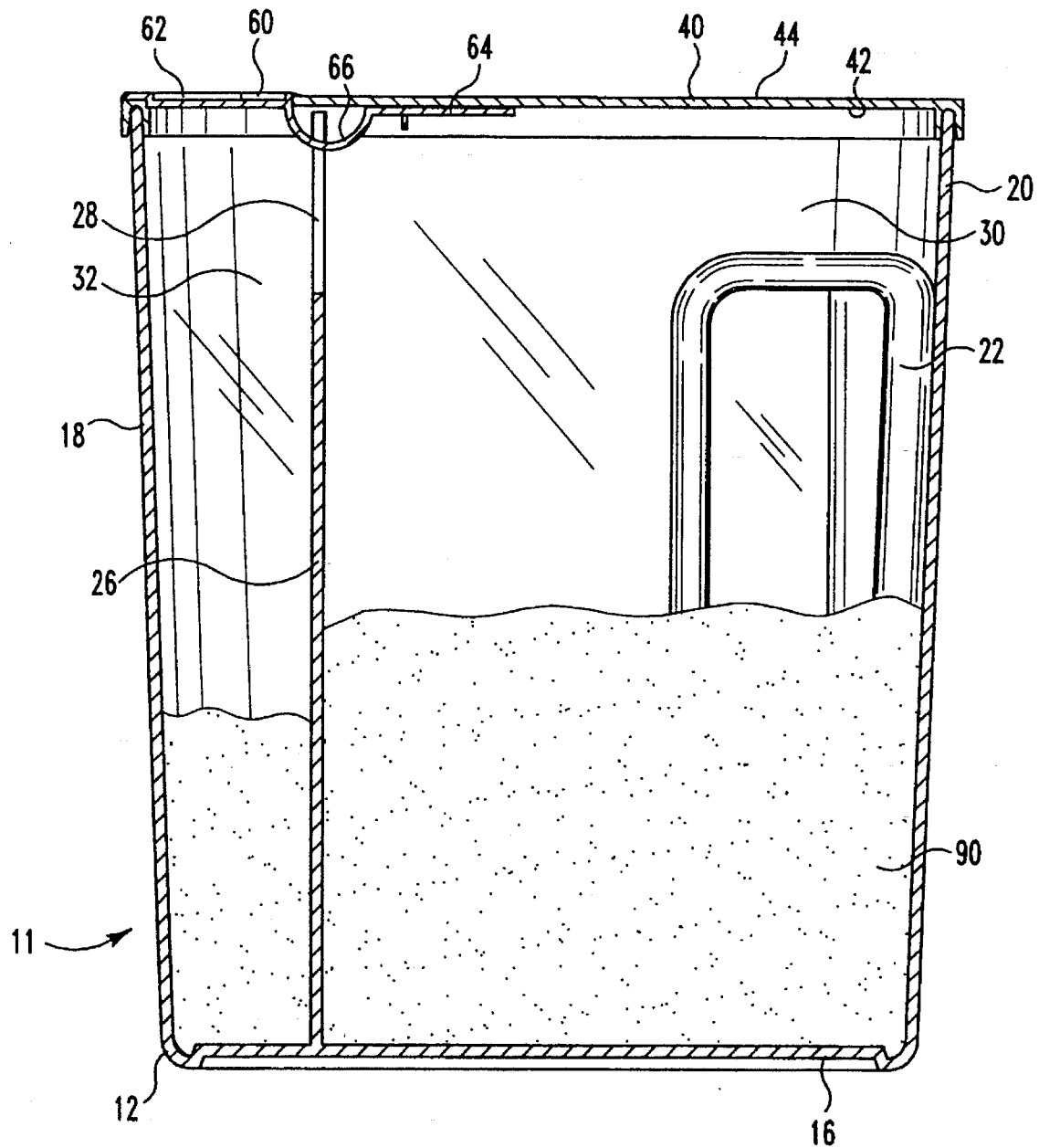
FIG. 12 is a side cross-section view of a measuring canister representing the present invention in an upright position, taken along line 10—10 of FIG. 4 and shown where a portion of the particulate material present in the storage compartment has been transferred to the measuring dispensing compartment.
Figure 13:
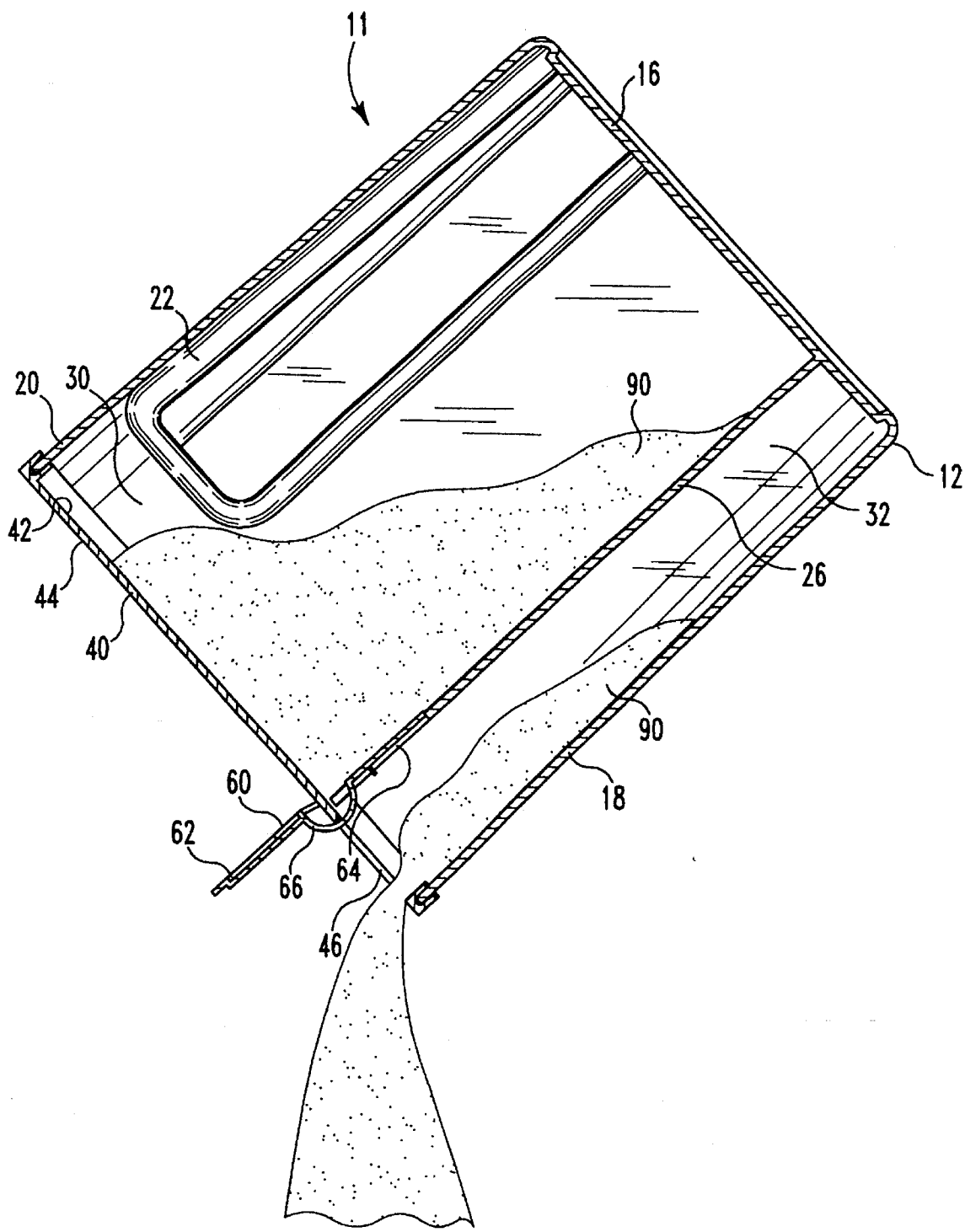
FIG. 13 is a side cross-section view of a measuring canister representing the present invention in a tilted position, taken along line 10—10 of FIG. 4 and shown where the particulate material present in the measuring dispensing compartment is being dispensed.

In use, particulate material 90 is placed in storage compartment 30, and cover 40 is oriented proximate to open top 14 and snapped into place with bead 36 disposed within slot 54. With flap 60 disposed in said first position, as shown in FIG. 10, the present invention may be used to store particulate material 90. Referring to FIG. 11, should it be desired to dispense a portion of particulate material 90, the present invention may be tilted using handle 22, thereby permitting particulate material 90 to flow through notch 28 from storage compartment 30 into measuring dispensing compartment 32. It will be appreciated that any volume of particulate material 90, up to the volume of measuring dispensing compartment 32, may be transferred from storage compartment 30 to measuring dispensing compartment 32 for dispensing, so that the user of the present invention is not limited dispensing a few discrete pre-selected volumes of particulate material 90. When the user believes that the volume of particulate material 90 that is desired to be dispensed has been transferred to measuring dispensing compartment 32, the present invention is placed in an upright position as shown in FIG. 12. Thereafter, the user may inspect measuring dispensing compartment 32 and compare the volume of particulate material 90 present in measuring dispensing compartment 32 with the volume of particulate material 90 desired to be dispensed, referring to indicia 34. Observation of the volume of particulate material 90 present in measuring dispensing compartment 32 and storage compartment is facilitated by the formation of container 12 of a visually translucent material, and partition 26 of a visually opaque material, thereby providing visual contrast between container 12, partition 26 and particulate material 90. In the event insufficient particulate material 90 is present in measuring dispensing compartment 32, the present invention may once again be tilted, allowing addition particulate material 90 to pass from storage compartment 30 through notch 28 into measuring dispensing compartment 32. On the other hand, should the volume of particulate material 90 present in measuring dispensing compartment be greater than the volume that the user desires to dispense, the present invention may be tilted in the opposite sense, allowing particulate material 90 to pass from measuring dispensing compartment 32 through notch 28, thereby returning particulate material 90 to storage compartment 30. When the desired volume of particulate material 90 is present in measuring dispensing compartment 32, flap 60 is rotated to said second position as shown in FIG. 13, with second end 64 snapping into notch 28, so that second end 64 covers and closes notch 28, preventing particulate material 90 from passing between storage compartment 30 and measuring dispensing compartment 32, and simultaneously acting to rotate first end 62 away from dispensing orifice 46. Next, the present invention is tilted, as depicted in FIG. 13, so that particulate material 90 present in measuring dispensing compartment 32 may be dispensed from the present invention through dispensing orifice 46, without affecting particulate material 90 in storage compartment 30. It will be appreciated that dispensing of particulate material 90 from the present invention is thereby performed in a controlled manner, that is, the rate at which particulate material 90 is dispensed through dispensing orifice 46 is controllable by the user by varying the angle at which the present invention is tilted, and further, particulate material 90 present in measuring dispensing compartment 32 may be dispensed in several increments, for instance, at necessitated by the requirements of slowly blending a volume of particulate material 90 into a mixture of other materials.

The present invention having been described in its preferred embodiment, it is clear that the present invention is susceptible to numerous modifications and embodiments within the ability of those skilled in the art and without the exercise of the inventive faculty. Accordingly, the scope of the present invention is defined as set forth by the scope of the following claims.

What is claimed is:

1. A measuring canister comprising:

a container having an open top and a generally planar bottom;

a partition having a notch, said partition disposed within said container so that said notch is adjacent to said top and divides the interior of said container into a storage compartment and a measuring dispensing compartment;

a cover having an interior surface, an exterior surface, and a dispensing orifice;

means for removably attaching said cover to said top so that said interior surface is adjacent to the interior of said container and said dispensing orifice is proximate to said measuring dispensing compartment; and a generally planar flap having a first end and a second end, said flap hinged to said cover so that said first end is disposed proximate to said exterior surface, said second end is disposed proximate to said interior surface, and said flap is movable between a first position where said first end is disposed to close said dispensing orifice and said second end is disposed proximate to said interior surface, and a second position where said first end is disposed away from said dispensing orifice and said second end is disposed to close said notch.

2. A measuring canister as defined in claim 1, wherein said partition is disposed generally normal to said bottom.

3. A measuring canister as defined in claim 1, further comprising handle means.

4. A measuring canister as defined in claim 3, wherein said handle means comprises an indented portion of said container disposed proximate to said storage compartment.

5. A measuring canister as defined in claim 1, further comprising means for removably attaching said first end to said cover when said flap is disposed in said first position.

6. A measuring canister as defined in claim 5, wherein said cover and said flap are each formed of a resilient material, and said means for removably attaching said first end to said cover comprises a snap-together type attachment.

7. A measuring canister as defined in claim 1, further comprising means for removably attaching said second end to said partition when said flap is disposed in said second position.

8. A measuring canister as defined in claim 7, wherein said partition and said flap are each formed of a resilient material, and said means for removably attaching said second end to said partition comprises a snap-together type attachment.

9. A measuring canister as defined in claim 1, wherein said container is formed of a resilient, visually translucent material, said partition is formed of a visually opaque material, and said cover is formed of a resilient material, and further comprising volumetric indicia disposed on said container proximate to said measuring dispensing compartment.

10. A measuring canister as defined in claim 9, wherein said means for removably attaching said cover to said top comprises a snap-on type seal.

11. A measuring canister comprising:

a container having an open top and a generally planar bottom;

a partition having a notch, said partition disposed generally normal to said bottom and within said container so that said notch is adjacent to said top and divides the interior of said container into a storage compartment and a measuring dispensing compartment;

a cover having an interior surface, an exterior surface, and a dispensing orifice;

means for removably attaching said cover to said top so that said interior surface is adjacent to the interior of said container and said dispensing orifice is proximate to said measuring dispensing compartment;

a generally planar flap having a first end and a second end, said flap hinged to said cover so that said first end is disposed proximate to said exterior surface, said second end is disposed proximate to said interior surface, and said flap is movable between a first position where said first end is disposed to close said dispensing orifice and said second end is disposed proximate to said interior surface, and a second position where said first end is disposed away from said dispensing orifice and said second end is disposed to close said notch;

means for removably attaching said first end to said cover when said flap is disposed in said first position;

means for removably attaching said second end to said partition when said flap is disposed in said second position; and handle means.

12. A measuring canister as defined in claim 11, further comprising volumetric indicia disposed on said container proximate to said measuring dispensing compartment.

13. A measuring canister as defined in claim 12, wherein said container is formed of a resilient, visually translucent material, said partition is formed of a visually opaque material, and said cover is formed of a resilient material.

14. A measuring canister as defined in claim 13, wherein said means for removably attaching said cover to said top comprises a snap-on type seal, and said handle means comprises an indented portion of said container disposed proximate to said storage compartment.

15. A measuring canister as defined in claim 12, wherein said cover and said flap are each formed of a resilient material, and said means for removably attaching said first end to said cover comprises a snap-together type attachment.

16. A measuring canister as defined in claim 15 wherein said partition and said flap are each formed of a resilient material, and said means for removably attaching said second end to said partition comprises a snap-together type attachment.

17. A measuring canister comprising:

a container having an open top and a generally planar bottom, said container formed of a resilient, visually translucent material;

a partition having a notch, said partition formed of a resilient, visually opaque material and disposed generally normal to said bottom and within said container so that said notch is adjacent to said top and divides the interior of said container into a storage compartment and a measuring dispensing compartment;

volumetric indicia disposed on said container proximate to said measuring dispensing compartment;

a cover having an interior surface, an exterior surface, and a dispensing orifice, said cover formed of a resilient material;

means for removably attaching said cover to said top so that said interior surface is adjacent to the interior of said container and said dispensing orifice is proximate to said measuring dispensing compartment;

a generally planar flap having a first end and a second end, said flap formed of a resilient material and hinged to said cover so that said first end is disposed proximate to said exterior surface, said second end is disposed proximate to said interior surface, and said flap is movable between a first position where said first end is disposed to close said dispensing orifice and said second end is disposed proximate to said interior surface, and a second position where said first end is disposed away from said dispensing orifice and said second end is disposed to close said notch;

means for removably attaching said first end to said cover when said flap is disposed in said first position;

means for removably attaching said second end to said partition when said flap is disposed in said second position; and handle means.

18. A measuring canister as defined in claim 17, wherein said handle means comprises an indented portion of said container disposed proximate to said storage compartment.

19. A measuring canister as defined in claim 17, wherein said means for removably attaching said cover to said top comprises a snap-on type seal.

20. A measuring canister as defined in claim 17, wherein said means for removably attaching said first end to said cover comprises a snap-together type attachment and said means for removably attaching said second end to said partition comprises a snap-together type attachment.

* * * * *